(12) United States Patent
Seo et al.

(10) Patent No.: US 9,537,639 B2
(45) Date of Patent: Jan. 3, 2017

(54) METHOD AND APPARATUS FOR TRANSMITTING CHANNEL STATE INFORMATION IN WIRELESS COMMUNICATION SYSTEM

(71) Applicant: LG ELECTRONICS INC., Seoul (KR)

(72) Inventors: Dongyoun Seo, Anyang-si (KR); Daesung Hwang, Anyang-si (KR); Bonghoe Kim, Anyang-si (KR); Joonkui Ahn, Anyang-si (KR)

(73) Assignee: LG Electronics Inc., Seoul (KR)

(*) Notice: Subject to any disclaimer, the term of this patent is extended or adjusted under 35 U.S.C. 154(b) by 57 days.

(21) Appl. No.: 14/400,149

(22) PCT Filed: May 13, 2013

(86) PCT No.: PCT/KR2013/004209
§ 371 (c)(1),
(2) Date: Nov. 10, 2014

(87) PCT Pub. No.: WO2013/169088
PCT Pub. Date: Nov. 14, 2013

(65) Prior Publication Data
US 2015/0092698 A1    Apr. 2, 2015

Related U.S. Application Data

(60) Provisional application No. 61/646,244, filed on May 11, 2012.

(51) Int. Cl.
*H04L 5/00* (2006.01)
*H04L 1/00* (2006.01)
*H04L 1/18* (2006.01)
*H04W 28/18* (2009.01)
*H04W 72/00* (2009.01)
*H04W 56/00* (2009.01)

(52) U.S. Cl.
CPC ........... *H04L 5/0057* (2013.01); *H04L 1/0026* (2013.01); *H04L 1/1893* (2013.01); *H04L 5/001* (2013.01); *H04W 28/18* (2013.01); *H04W 56/00* (2013.01); *H04W 72/00* (2013.01)

(58) Field of Classification Search
None
See application file for complete search history.

(56) References Cited

U.S. PATENT DOCUMENTS

| 2011/0319068 | A1* | 12/2011 | Kim | H04L 1/1671 455/422.1 |
| 2012/0039216 | A1* | 2/2012 | Li | H04L 5/0032 370/254 |
| 2013/0028109 | A1* | 1/2013 | Jongren | H04W 24/10 370/252 |

FOREIGN PATENT DOCUMENTS

| KR | 10-2011-0069741 A | 6/2011 |
| KR | 10-2012-0001273 A | 1/2012 |
| KR | 10-2012-0016013 A | 2/2012 |

(Continued)

*Primary Examiner* — Anh Ngoc Nguyen
(74) *Attorney, Agent, or Firm* — Dentons US LLP

(57) ABSTRACT

Provided is a method for transmitting channel state information (CSI) by a terminal in a wireless communication system. The method sets a group including a plurality of cells, receives parameters for CSI transmission timings for the plurality of cells, and determines the CSI transmission timings for the plurality of cells on the basis of the parameters. The CSI transmission timings for at least two cells from among the plurality of cells are aligned to be the same.

8 Claims, 11 Drawing Sheets

(56) References Cited

FOREIGN PATENT DOCUMENTS

| KR | 10-2012-0018120 A | 4/2012 |
|---|---|---|
| WO | 2011-121063 A1 | 10/2011 |

\* cited by examiner

//METHOD AND APPARATUS FOR TRANSMITTING CHANNEL STATE INFORMATION IN WIRELESS COMMUNICATION SYSTEM

This application is a 35 USC §371 National Stage entry of International Application No. PCT/KR2013/004209 filed on May 13, 2013, and claims priority to U.S. Provisional Application No. 61/646,244 filed on May 11, 2012, both of which are hereby incorporated by reference in their entireties as if fully set forth herein.

BACKGROUND OF THE INVENTION

Field of the Invention

The present invention relates to wireless communication and, more particularly, to an apparatus and method for transmitting channel state information in a wireless communication system.

Related Art

One of the most important requirements of a next-generation wireless communication system is to be capable of supporting a high data transfer rate. To this end, various techniques, such as Multiple Input Multiple Output (MIMO), Cooperative Multiple Point (CoMP) transmission, and a relay, are being researched, but the most basic and stable solution is to increase a bandwidth.

Frequency resources are now in the saturation state, and various techniques are partially being used in a wide range of frequency bands. For this reason, as a scheme for securing a wide bandwidth in order to satisfy a need for a higher data transfer rate, a Carrier Aggregation (CA), that is, a concept in which each of scattered bands is designed to satisfy a basic requirement in which each band can operate as an independent system and a number of bands are aggregated into a single system, is being introduced. In this case, a band or carrier that is capable of independently operating is defined as a Component Carrier (CC).

In a recent communication standard, for example, in a standard, such as 3rd Generation Partnership Project (3GPP) Long Term Evolution-Advanced (LTE-A) or 802.16m, to extent a bandwidth up to a 20 MHz or more is being taken into consideration. In this case, a wideband is supported by aggregating one or more CCs. For example, if a single CC corresponds to a bandwidth of 5 MHz, a maximum bandwidth of 20 MHz is supported by aggregating 4 carriers. A system supporting a CA as described above is called a CA system.

Meanwhile, a wireless communication system controls a Modulation and Coding Scheme (MCS) and transmission power depending on a given channel using link adaptation in order to utilize a given channel capacity to a maximum degree. In order for a base station to perform such link adaptation, a terminal needs to feed channel state information back.

In accordance with a conventional technology, when a collision in which pieces of periodic channel state information about a plurality of carriers are configured in a CA system so that they are transmitted in a specific subframe at the same time is generated, only the periodic channel state information of a single carrier that is determined according to priority is transmitted.

If pieces of periodic channel state information about a plurality of carriers collide against each other in the same subframe, all the pieces of periodic channel state information may need to be transmitted. In such a case, there is a problem in that the transmission time point of periodic channel state information about each of the carriers will be configured using what scheme.

SUMMARY OF THE INVENTION

The present invention provides an apparatus and method for transmitting channel state information in a wireless communication system.

In an aspect, there is provided a method of transmitting, by UE, Channel State Information (CSI) in a wireless communication system. The method configuring a group including a plurality of cells, receiving a parameter for CSI transmission time points of the plurality of cells, and determining the CSI transmission time points of the plurality of cells based on the parameter, wherein the CSI transmission time points of at least two of the plurality of cell are identically arranged User equipment provided in another aspect includes a Radio Frequency (RF) unit sending and receiving radio signals and a processor connected to the RF unit, wherein the processor configures a group including a plurality of cells, receives a parameter for CSI transmission time points of the plurality of cells, and determines CSI transmission time points of the plurality of cells based on the parameter, and the CSI transmission time points of at least two of the plurality of cell are identically arranged.

In accordance with the present invention, the CSI transmission time points of a plurality of cells can be arranged. Accordingly, pieces of CSI about the plurality of cells can be transmitted in the same subframe at the same time. Furthermore, the number of bits to be transmitted in each subframe in which CSI is transmitted can be made the same.

DESCRIPTION OF EXEMPLARY EMBODIMENTS

Long Term Evolution (LTE) according to the $3^{rd}$ Generation Partnership Project (3GPP) standardization organization is part of Evolved-UMTS (E-UMTS) using an Evolved-Universal Terrestrial Radio Access Network (E-UTRAN). LTE adopts Orthogonal Frequency Division Multiple Access (OFDMA) in downlink and adopts Single Carrier-Frequency Division Multiple Access (SC-FDMA) in uplink.

LTE-Advanced (LTE-A) is the evolution of LTE. In order to clarify a description hereinafter, 3GPP LTE/LTE-A are chiefly described, but the technical spirit of the present invention is not limited thereto.

A wireless device may be fixed or mobile and may also be called another term, such as User Equipment (UE) a Mobile Station (MS), a Mobile Terminal (MT), a User Terminal (UT), a Subscriber Station (SS), a Personal Digital Assistant (PDA), a wireless modem, or a handheld device. Alternatively, the wireless device may be a device supporting only data communication, such as a Machine-Type Communication (MTC) device.

In general, a Base Station (BS) refers to a fixed station that communicates with a wireless device, and the BS may also be called another term, such as an evolved NodeB (eNB), a Base Transceiver System (BTS), or an access point.

Hereinafter, an example in which the present invention is applied based on 3GPP Long Term Evolution (LTE) based on 3rd Generation Partnership Project (3GPP) Technical Specification (TS) release 8 or 3GPP LTE-A based on 3GPP TS release 10 is described. This is only illustrative, and the present invention may be applied to various wireless communication networks. Hereinafter, LTE includes LTE and/or LTE-A.

Figure 1:
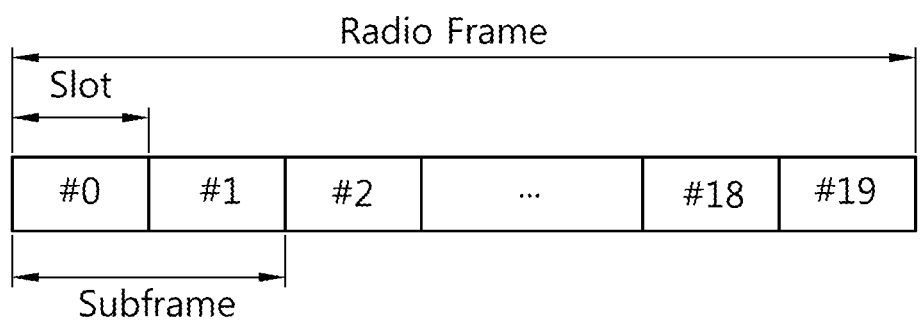
FIG. 1 illustrates the structure of a downlink wireless frame in 3GPP LTE-A.

FIG. 1 illustrates the structure of a downlink wireless frame in 3GPP LTE-A. For the structure of the downlink radio frame, reference may be made to Paragraph 6 of 3GPP TS 36.211 V10.2.0 (2011 June) "Evolved Universal Terrestrial Radio Access (E-UTRA); Physical Channels and Modulation (Release 10)".

The radio frame includes 10 subframes to which indices 0~9 are allocated. A single subframe includes two contiguous slots. The time taken to send a single subframe is called a Transmission Time Interval (TTI). For example, the length of a single subframe may be 1 ms, and the length of a single slot may be 0.5 ms.

A single slot may include a plurality of Orthogonal Frequency Division Multiplexing (OFDM) symbols in a time domain. The OFDM symbol is only for representing a single symbol period in the time domain because 3GPP LTE uses Orthogonal Frequency Division Multiple Access (OFDMA) in downlink (DL), and there is no limit to a multiple access method or name. For example, an OFDM symbol may be called another term, such as a Single Carrier-Frequency Division Multiple Access (SC-FDMA) symbol or a symbol period.

A single slot is illustrated as including 7 OFDM symbols, but the number of OFDM symbols included in a single slot may be changed depending on the length of a Cyclic Prefix (CP). In accordance with 3GPP TS 36.211 V10.2.0, a single slot includes 7 OFDM symbols in a normal CP, and a single slot includes 6 OFDM symbols in an extended CP.

A Resource Block (RB) is a resource allocation unit and includes a plurality of subcarriers in a single slot. For example, if a single slot includes 7 OFDM symbols in the time domain and a resource block includes 12 subcarriers in the frequency domain, a single resource block may include 7×12 Resource Elements (REs).

Figure 2:
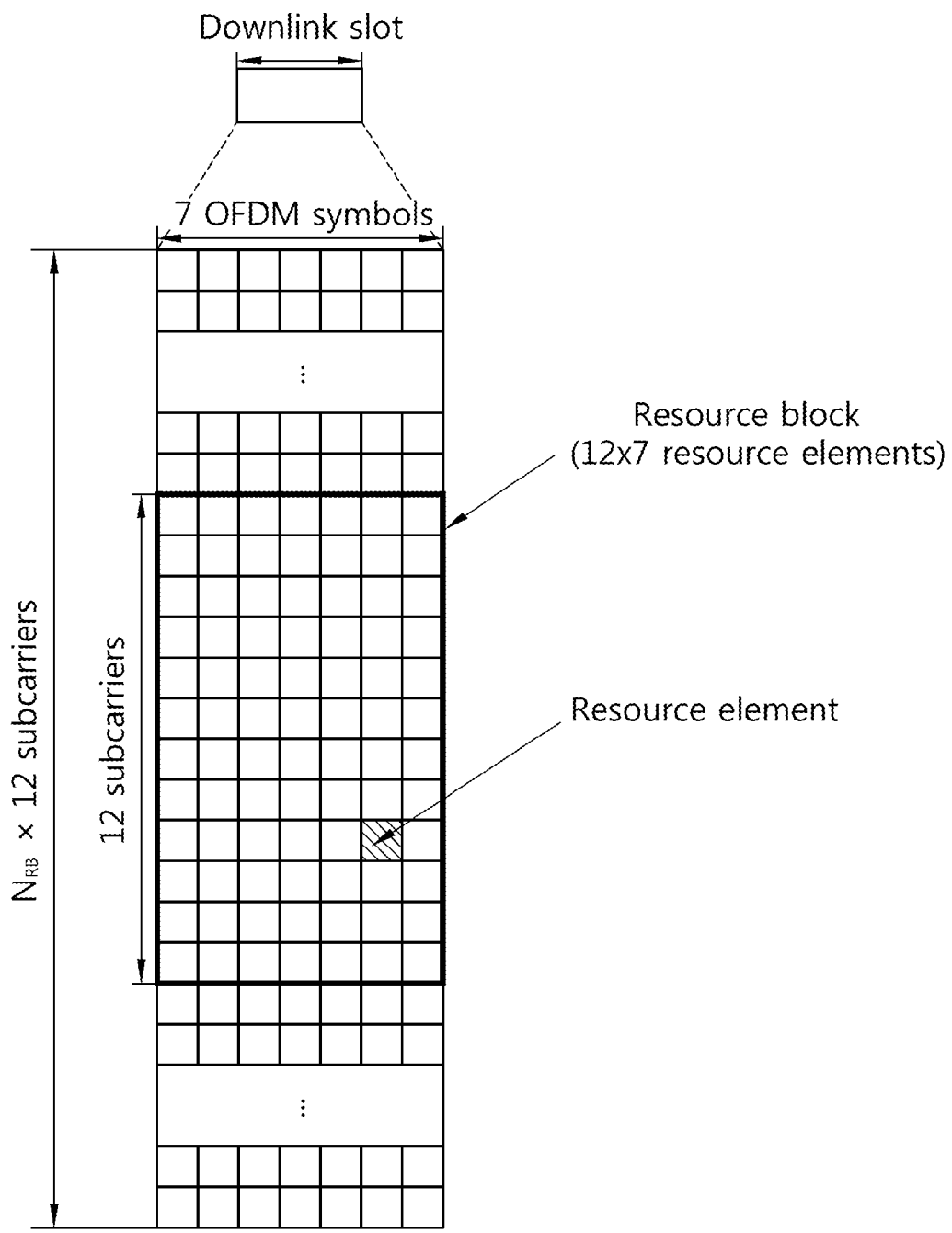
FIG. 2 illustrates an example of the resource grid of a single downlink slot.

FIG. 2 illustrates an example of the resource grid of a single downlink slot.

Referring to FIG. 2, the downlink slot includes a plurality of OFDM symbols in a time domain and includes an $N_{RB}$ number of Resource Blocks (RB) in a frequency domain. The RB is a resource allocation unit, and it includes a single slot in the time domain and a plurality of contiguous subcarriers in the frequency domain. The number of RBs $N_{RB}$ included in the downlink slot depends on a downlink transmission bandwidth configured in a cell. For example, in an LTE system, the number of RBs $N_{RB}$ may be any one of 6 to 110. An uplink slot may have the same structure as the downlink slot.

Each element on the resource grid is referred to as a Resource Element (RE). The RE on the resource grid may be identified by an index pair (k,l) within a slot. In this case, k (k=0, . . . , $N_{RB}$×12−1) is a subcarrier index in the frequency domain, and l (l=0, . . . , 6) is an OFDM symbol index in the time domain.

In FIG. 2, a single RB is illustrated as including 7×12 REs, including 7 OFDM symbols in the time domain and 12 subcarriers in the frequency domain, but the number of OFDM symbols and the number of subcarriers within an RB are not limited thereto. The number of OFDM symbols and the number of subcarriers may be changed in various ways depending on the length of a CP, frequency spacing, etc. Any one of 128, 256, 512, 1024, 1536, and 2048 may be selected and used as the number of subcarriers in a single OFDM symbol.

Figure 3:
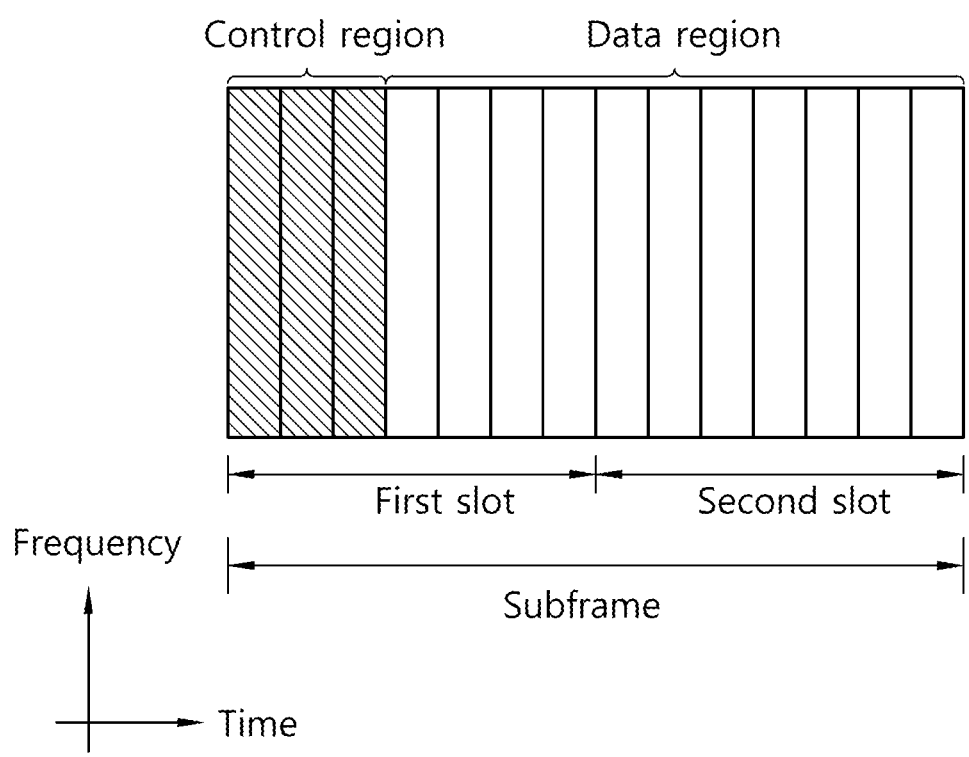
FIG. 3 illustrates a downlink subframe.

FIG. 3 illustrates a downlink subframe.

The downlink (DL) subframe is divided into a control region and a data region in a time domain. The control region includes a maximum of former 4 OFDM symbols in the first slot within of DL subframe, but the number of OFDM symbols included in the control region may be changed. Control channels different from a physical downlink control channel (PDCCH) are allocated to the control region, and PDSCHs are allocated to the data region.

As disclosed in 3GPP TS 36.211 V10.2.0, in 3GPP LTE/LTE-A, physical control channels includes a physical downlink control channel (PDCCH), a physical control format indicator channel (PCFICH), a physical hybrid-ARQ indicator channel (PHICH).

A PCFICH transmitted in the first OFDM symbol of the subframe carries a Control Format Indicator (CFI) regarding the number of OFDM symbols (i.e., the size of the control region) used to send control channels within the subframe. A wireless device first receives a CFI on a PCFICH and monitors a PDCCH.

Unlike a PDCCH, a PCFICH is transmitted through the fixed PCFICH resources of the subframe without using blind decoding.

A PHICH carries positive-acknowledgement (ACK)/ negative-acknowledgement (NACK) signals for an uplink Hybrid Automatic Repeat reQuest (HARQ). ACK/NACK signals for uplink (UL) data on a PUSCH transmitted by a wireless device is transmitted on a PHICH.

A physical broadcast channel (PBCH) is transmitted in the former 4 OFDM symbols of a second slot within the first subframe of the radio frame. The PBCH carries system information that is essential for A WIRELESS DEVICE to communicate with a BS. System information transmitted through the PBCH is called a Master Information Block (MIB). In contrast, system information transmitted on a PDSCH indicated by a PDCCH is called a System Information Block (SIB).

Control information transmitted through a PDCCH is called Downlink Control Information (DCI). The DCI may include the resource allocation of a PDSCH (this is also called a downlink (DL) grant), the resource allocation of a PUSCH (this is also called an uplink (UL) grant), a set of transmit power control commands for pieces of UE within a specific UE group and/or the activation of a Voice over Internet Protocol (VoIP).

In 3GPP LTE/LTE-A, the transmission of a DL transport block is performed in the form of a pair of a PDCCH and a PDSCH. The transmission of an UL transport block is performed in the form of a pair of a PDCCH and a PUSCH. For example, a wireless device receives a DL transport block on a PDSCH indicated by a PDCCH. A wireless device monitors a PDCCH in a DL subframe and receives DL resource allocation on the PDCCH. A wireless device receives a DL transport block on a PDSCH indicated by DL resource allocation.

A BS determines a PDCCH format based on DCI to be transmitted to a wireless device, attaches a Cyclic Redundancy Check (CRC) to the DCI, and masks a unique identifier (this is also called a Radio Network Temporary Identifier (RNTI)) to the CRC depending on the owner or use of a PDCCH.

If the PDCCH is a PDCCH for a specific wireless device, the unique identifier of the wireless device, for example, a Cell-RNTI (C-RNTI) may be masked to the CRC. Alternatively, if the PDCCH is a PDCCH for a paging message, a paging instruction identifier, for example, a Paging-RNTI (P-RNTI) may be masked to the CRC. If the PDCCH is a PDCCH for system information, a system information identifier, a System Information-RNTI (SI-RNTI) may be masked to the CRC. A Random Access-RNTI (RA-RNTI) may be masked to the CRC in order to indicate a random access response, that is, a response to the transmission of a random access preamble. In order to indicate a Transmit Power Control (TPC) command for a plurality of wireless devices, a TPC-RNTI may be masked to the CRC. If the PDCCH is a PDCCH for Semi-Persistent Scheduling (SPS), an SPS-C-RNTI may be masked to the CRC.

If the C-RNTI is used, a PDCCH carries control information for a corresponding and specific wireless device (this is called UE-specific control information). If another RNTI is used, a PDCCH carries common control information that is received by all of or a plurality of wireless devices within a cell.

Coded data is generated by encoding DCI to which CRC has been added. The encoding includes channel encoding and rate matching. The coded data is modulated, thereby generating modulation symbols. The modulation symbols are mapped to a physical Resource Element (RE).

The control region within the subframe includes a plurality of Control Channel Elements (CCEs). The CCE is a logical allocation unit used to provide a PDCCH with a coding rate according to the state of a radio channel, and the CCE corresponds to a plurality of Resource Element Groups (REGs). The REG includes a plurality of REs. The format of a PDCCH and the number of available bits of the PDCCH are determined depending on association between the number of CCEs and a coding rate provided by the CCEs.

A single REG includes 4 REs, and a single CCE includes 9 REGs. In order to configure a single PDCCH, $\{1, 2, 4, 8\}$ CCEs may be used. Each of the elements of $\{1, 2, 4, 8\}$ is called a CCE aggregation level.

The number of CCEs used to send a PDCCH is determined by a BS depending on a channel state. For example, a wireless device having a good DL channel state may use a single CCE to send a PDCCH. a wireless device having a poor DL channel state may use 8 CCEs to send a PDCCH.

A control channel formed of one or more CCEs performs interleaving in an REG unit and is mapped to physical resources after a cyclic shift based on a cell identifier (ID) is performed.

Figure 4:
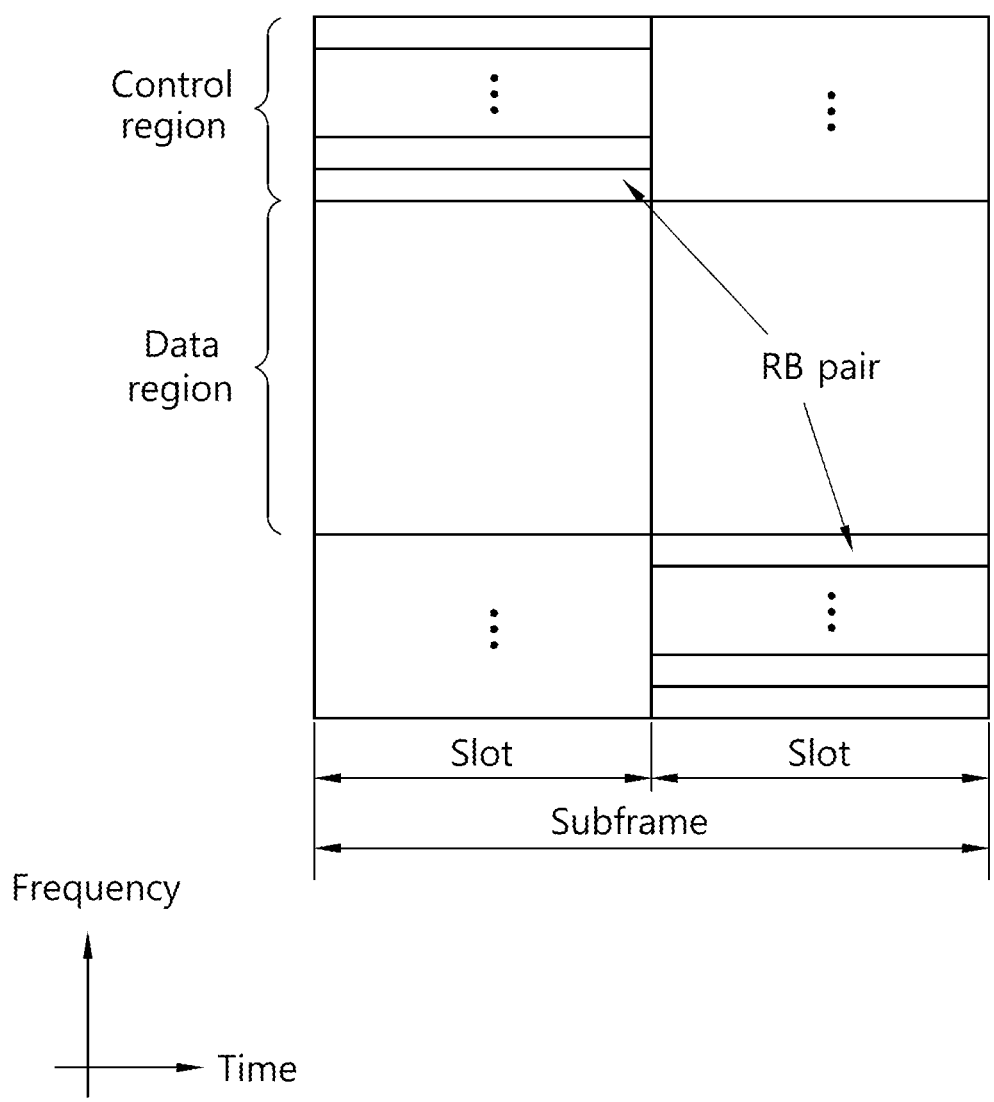
FIG. 4 illustrates the structure of an uplink subframe.

FIG. 4 illustrates the structure of an uplink subframe.

Referring to FIG. 4, the uplink subframe may be divided into a control region and a data region in a frequency domain. A physical uplink control channel (PUCCH) in which uplink control information is transmitted is allocated to the control region. A physical uplink shared channel (PUSCH) in which data (control information may also be transmitted according to circumstances) is transmitted is allocated to the data region. UE may send a PUCCH and a PUSCH at the same time or may send only any one of a PUCCH and a PUSCH depending on a configuration.

A PUCCH for a single piece of UE is allocated in the form of a RB pair in an subframe. RBs belonging to the RB pair occupy different subcarriers in a first slot and a second slot. A frequency occupied by RBs that belong to an RB pair allocated to a PUCCH is changed based on a slot boundary. This is said that the RB pair allocated to the PUCCH has been frequency-hopped at the slot boundary. A frequency diversity gain can be obtained by sending uplink control information through different subcarriers over time.

Hybrid Automatic Repeat reQuest (HARQ) Acknowledgement)(ACK)/Non-acknowledgement (NACK), Channel Status Information (CSI) indicative of a downlink channel state, for example, a Channel Quality Indicator (CQI), a Precoding Matrix Index (PMI), a Precoding Type Indicator (PTI), Rank Indication (RI), etc. may be transmitted on a PUCCH.

The CQI provides information about link adaptive parameters that may be supported by UE with respect to a given time. The CQI may be indicative of a data rate that may be supported by a downlink channel by taking into consideration the characteristics of a UE receiver, a Signal to Interference plus Noise Ratio (SINR), etc. A BS may determine modulation (QPSK, 16-QAM, 64-QAM, etc.) and a coding rate to be applied to a downlink channel using the CQI. The CQI may be generated using various methods. For example, the various methods may include a method of quantizing a channel state without change and feeding the quantized channel state back, a method of calculating a Signal to Interference plus Noise Ratio (SINR) and feeding the SINR back, a method of providing notification of a state that is actually applied to a channel along with a Modulation Coding Scheme (MCS), etc. If the CQI is generated based on an MCS, the MCS includes a modulation scheme and coding scheme, a corresponding coding rate, etc.

The PMI provides information about a precoding matrix in precoding based on a codebook. The PMI is related to Multiple Input Multiple Output (MIMO). In MIMO, the feedback of the PMI is called closed-loop MIMO.

The RI is information about a rank (i.e., the number of layers) recommended by UE. That is, the RI is indicative of the number of independent streams used for spatial multiplexing. The RI is fed back only when UE operates in MIMO mode using spatial multiplexing. The RI is always related to one or more CQI feedbacks. That is, a CQI that is fed back is calculated assuming a specific RI value. In general, the RI is fed back with a number less than that of the CQI because the rank of a channel is more slowly changed than the CQI. The transmission cycle of the RI may be a multiple of that of the CQI/PMI. The RI is given to the entire system band, and frequency-selective RI feedback is not supported.

Periodic channel state information may be transmitted through a PUCCH.

A PUSCH is mapped to an uplink shared channel (UL-SCH), that is, a transport channel. Uplink data transmitted on a PUSCH may be a transport block, that is, a data block for an UL-SCH transmitted for a TTI. The transport block may include user data. Alternatively, the uplink data may be multiplexed data. The multiplexed data may have been obtained by multiplexing the transport block for the uplink shared channel (UL-SCH) and channel state information. For example, channel state information multiplexed with data may include a CQI, a PMI, an RI, etc. Alternatively, the uplink data may include only channel state information. Periodic or aperiodic channel state information may be transmitted through a PUSCH.

<Semi-Persistent Scheduling (SPS)>

In a wireless communication system, UE performs an operation of receiving scheduling information, such as an DL grant and an UL grant, through a PDCCH, receiving a PDSCH based on scheduling information, and sending a PUSCH. In general, a DL grant and a PDSCH are received within the same subframe. Furthermore, in the case of FDD, UE sends a PUSCH after 4 subframes from a subframe in which an UL grant has been received. LTE also provides Semi-Persistent Scheduling (SPS) in addition to such dynamic scheduling.

DL or UL SPS may inform UE that semi-persistent transmission (PUSCH)/reception (PDSCH) are performed in which subframes through a high layer signal, such as Radio Resource Control (RRC). A Parameter given as the higher layer signal may be the period of a subframe and an offset value, for example.

When UE receives the activation or release signal of SPS transmission through a PDCCH after recognizing SPS transmission/reception through RRC signaling, the UE performs or releases SPS transmission/reception. That is, UE does not immediately perform the SPS transmission/reception although SPS is allocated through the RRC signaling, but when the activation or release signal is received through the PDCCH, the UE performs the SPS transmission/reception in a subframe period allocated through the RRC signaling and a subframe corresponding to an offset value based on frequency resources (i.e., a resource block) according to a resource block designated by the PDCCH and modulation and a coding rate according to MCS information. When a release signal is received through a PDCCH, UE stops SPS transmission/reception. The UE restarts the stopped SPS transmission/reception using frequency resources, an MCS, etc. designated by a PDCCH including an activation signal when the PDCCH is received.

A PDCCH for SPS activation is hereinafter called an SPS activation PDCCH, and a PDCCH for SPS release is hereinafter called an SPS release PDCCH. UE may validate whether a PDCCH is an SPS activation/release PDCCH if all the following conditions are satisfied. 1. CRC parity bits obtained from a PDCCH payload have been scrambled with an SPS C-RNTI, and 2. The value of a new data indicator field must be '0'. Furthermore, if each of field values included in a PDCCH is set as in the values of the following table, UE accepts the Downlink Control Information (DCI) of a corresponding PDCCH as SPS activation or release.

TABLE 1

| | DCI format 0 | DCI format 1/1A | DCI format 2/2A/2B |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |

TABLE 1-continued

| | DCI format 0 | DCI format 1/1A | DCI format 2/2A/2B |
|---|---|---|---|
| Modulation and coding scheme | N/A | MSB is set to '0' | For the enabled transport block: MSB is set to '0' |
| Redundancy version | N/A | set to '00' | For the enabled transport block: set to '00' |

Table 1 illustrates the field values of an SPS activation PDCCH for validating SPS activation.

TABLE 2

| | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

Table 2 illustrates the field values of an SPS release PDCCH for validating SPS release.

<Method of Transmitting CSI in a Wireless Communication System>

In order to utilize a given channel capacity to a maximum degree in a wireless communication system, an MCS and transmission power are controlled according to a given channel using link adaptation. In order for a BS to perform such link adaptation, UE has to feed CSI back.

1. Channel State Information (CSI)

For efficient communication, channel information needs to be fed back. In general, downlink channel information is transmitted through uplink, and uplink channel information is transmitted through downlink. Channel information indicative of the state of a channel is called CSI, and the CSI includes a Precoding Matrix Index (PMI), a Rank Indicator (RI), a Channel Quality Indicator (CQI). UE may generate CSI using a received reference signal or data. The reference signal may include a Cell-specific Reference Signal (CRS), a Channel Stat Information Reference Signal (CSI-RS), and a User equipment-specific Reference Signal (URS).

2. Downlink Transmission Mode

Downlink transmission mode may be divided into nine types.

Transmission mode 1: a single antenna port, a port 0

Transmission mode 2: transmit diversity

Transmission mode 3: open loop spatial multiplexing: open loop mode capable of rank adaptation based on RI feedback. If a rank is 1, transmit diversity may be applied. If a rank is greater than 1, large delay CDD may be used.

Transmission mode 4: closed-loop spatial multiplexing or transmit diversity

Transmission mode 5: transmit diversity or multi-user MIMO

Transmission mode 6: transmit diversity or closed-loop spatial multiplexing having a single transport layer Transmission mode 7: if the number of PBCH antenna ports is 1, a single antenna port (port 0) is used. If not, transmit diversity is used. Alternatively, single antenna transmission (port 5)

Transmission mode 8: if the number of PBCH antenna ports is one, a single antenna port (port 0) is used. If not, transmit diversity. Alternatively, dual layer transmission using antenna ports 7 and 8 or single antenna port transmission using a port 7 or a port 8.

Transmission mode 9: a maximum of 8 layer transmission (ports 7 to 14). In the case where a subframe is not a Multicast Broadcast Single Frequency Network (MBSFN) subframe, if the number of PBCH antenna ports is one, single antenna port transmission (port 0) is used. If not, transmit diversity. If a subframe is an MBSFN subframe, single antenna port transmission (port 7).

3. Periodic Transmission of CSI

CSI may be periodically transmitted through a PUCCH based on a cycle determined by a higher layer. UE may be configured by a high layer signal semi-persistently so that it periodically feeds CSI (a CQI, a PMI, or an RI) differentially through a PUCCH. In this case, the UE sends corresponding CSI according to CSI modes defined as in the following table.

TABLE 3

|  | | PMI Feedback Type | |
|---|---|---|---|
|  | | No PMI | Single PMI |
| PUCCH CQI Feedback Type | Wideband (wideband CQI) | Mode 1-0 | Mode 1-1 |
|  | UE Selected (subband CQI) | Mode 2-0 | Mode 2-1 |

The following periodic CSI reporting modes in a PUCCH are supported according to each transmission mode.

TABLE 4

| TRANSMISSION MODE | PUCCH CSI REPORTING MODES |
|---|---|
| Transmission mode 1 | Modes 1-0, 2-0 |
| Transmission mode 2 | Modes 1-0, 2-0 |
| Transmission mode 3 | Modes 1-0, 2-0 |
| Transmission mode 4 | Modes 1-1, 2-1 |
| Transmission mode 5 | Modes 1-1, 2-1 |
| Transmission mode 6 | Modes 1-1, 2-1 |
| Transmission mode 7 | Modes 1-0, 2-0 |
| Transmission mode 8 | Modes 1-1, 2-1 if PMI/RI reporting have been configured for UE, Modes 1-0, 2-0 if PMI/RI reporting have not been configured for UE |
| Transmission mode 9 | Modes 1-1, 2-1 if PMI/RI reporting have been configured for UE and the number of CSI-RS ports is greater than 1, Modes 1-0, 2-0 if PMI/RI reporting have not been configured for UE or the number of CSI-RS ports is 1 |

Meanwhile, a collision between CSI reports refers to a case where a subframe configured to send first CSI and a subframe configured to send second CSI are the same. If a collision between CSI reports occurs, first CSI and second CSI may be transmitted at the same time or the transmission of CSI having low priority may be abandoned (this is called drop) and CSI having high priority may be transmitted depending on the priorities of the first CSI and the second CSI.

A CSI report through a PUCCH may include various report types as follows depending on transmission combinations of a CQI/PMI/RI. A cycle and an offset value divided according to each report type (hereinafter may be abbreviated as a CSI Type or a type) are supported.

Type 1: Support the CQI feedback of a subband selected by UE.
Type 1a: Support a subband CQI and second PMI feedback.
Type 2, 2b, 2c: Support a wideband CQI and PMI feedback.
Type 2a: Support wideband PMI feedback.
Type 3: Support RI feedback.
Type 4: Send a wideband CQI.
Type 5: Support an RI and wideband PMI feedback.
Type 6: Support an RI and PTI feedback.

In relation to each serving cell (a serving cell is described later), $N_{pd}$, that is, a cycle of a subframe unit, and an offset $N_{offset,CQI}$ are determined based on a parameter 'cqi-pmi-ConfigIndex' ($I_{CQI/PMI}$) with respect to CQI/PMI reporting. Furthermore, in relation to each serving cell, a cycle $M_{RI}$ and a relative offset $N_{offset,RI}$ are determined based on a parameter 'ri-ConfigIndex' ($I_{RI}$) with respect to RI reporting.

The following table illustrates the mapping relationships between $I_{CQI/PMI}$, $N_{pd}$, and the offset $N_{offset,CQI}$ in Frequency Division Duplex (FDD).

TABLE 5

| $I_{CQI/PMI}$ | Value of $N_{pd}$ | Value of $N_{OFFSET,CQI}$ |
|---|---|---|
| $0 \le I_{CQI/PMI} \le 1$ | 2 | $I_{CQI/PMI}$ |
| $2 \le I_{CQI/PMI} \le 6$ | 5 | $I_{CQI/PMI} - 2$ |
| $7 \le I_{CQI/PMI} \le 16$ | 10 | $I_{CQI/PMI} - 7$ |
| $17 \le I_{CQI/PMI} \le 36$ | 20 | $I_{CQI/PMI} - 17$ |
| $37 \le I_{CQI/PMI} \le 76$ | 40 | $I_{CQI/PMI} - 37$ |
| $77 \le I_{CQI/PMI} \le 156$ | 80 | $I_{CQI/PMI} - 77$ |
| $157 \le I_{CQI/PMI} \le 316$ | 160 | $I_{CQI/PMI} - 157$ |
| $I_{CQI/PMI} = 317$ |  | Reserved |
| $318 \le I_{CQI/PMI} \le 349$ | 32 | $I_{CQI/PMI} - 318$ |
| $350 \le I_{CQI/PMI} \le 413$ | 64 | $I_{CQI/PMI} - 350$ |
| $414 \le I_{CQI/PMI} \le 541$ | 128 | $I_{CQI/PMI} - 414$ |
| $542 \le I_{CQI/PMI} \le 1023$ |  | Reserved |

The following table illustrates the mapping relationships between $I_{CQI/PMI}$, $N_{pd}$, and the offset $N_{offset,CQI}$ in Time Division Duplex (TDD).

TABLE 6

| $I_{CQI/PMI}$ | Value of $N_{pd}$ | Value of $N_{OFFSET,CQI}$ |
|---|---|---|
| $I_{CQI/PMI} = 0$ | 1 | $I_{CQI/PMI}$ |
| $1 \le I_{CQI/PMI} \le 5$ | 5 | $I_{CQI/PMI} - 1$ |
| $6 \le I_{CQI/PMI} \le 15$ | 10 | $I_{CQI/PMI} - 6$ |
| $16 \le I_{CQI/PMI} \le 35$ | 20 | $I_{CQI/PMI} - 16$ |
| $36 \le I_{CQI/PMI} \le 75$ | 40 | $I_{CQI/PMI} - 36$ |
| $76 \le I_{CQI/PMI} \le 155$ | 80 | $I_{CQI/PMI} - 76$ |
| $156 \le I_{CQI/PMI} \le 315$ | 160 | $I_{CQI/PMI} - 156$ |
| $316 \le I_{CQI/PMI} \le 1023$ |  | Reserved |

The following table illustrates the mapping relationships between $I_{RI}$, $M_{RI}$, and the offset $N_{offset,RI}$.

TABLE 7

| $I_{RI}$ | Value of $M_{RI}$ | Value of $N_{OFFSET,RI}$ |
|---|---|---|
| $0 \le I_{RI} \le 160$ | 1 | $-I_{RI}$ |
| $161 \le I_{RI} \le 321$ | 2 | $-(I_{RI} - 161)$ |
| $322 \le I_{RI} \le 482$ | 4 | $-(I_{RI} - 322)$ |
| $483 \le I_{RI} \le 643$ | 8 | $-(I_{RI} - 483)$ |
| $644 \le I_{RI} \le 804$ | 16 | $-(I_{RI} - 644)$ |
| $805 \le I_{RI} \le 965$ | 32 | $-(I_{RI} - 805)$ |
| $966 \le I_{RI} \le 1023$ |  | Reserved |

'cqi-pmi-ConfigIndex' ($I_{CQI/PMI}$) and 'ri-ConfigIndex' ($I_{RI}$) are configured by a high layer signal, such as an RRC message. The relative offset $N_{offset,RI}$ for an RI has a value of a set $\{0, -1, \ldots, -(N_{pd}-1)\}$.

A subframe configured so that UE reports CSI is called a CSI subframe (or CSI transmission subframe). A CSI subframe set formed of a plurality of CSI subframes may be configured for UE. If reporting is configured for UE in two or more CSI subframe sets, 'cqi-pmi-ConfigIndex' and 'ri-ConfigIndex' corresponding to each of the two CSI subframe sets are given. For example, if CSI reporting is configured in two CSI subframe sets, 'cqi-pmi-ConfigIndex' and 'ri-ConfigIndex' are about the first CSI subframe set, and 'cqi-pmi-ConfigIndex2' and 'ri-ConfigIndex2' are about the second CSI subframe set.

If wideband CQI/PMI reporting is configured, subframes in which reporting on wideband CQI/PMI is performed may be subframes that satisfy the following equation.

$$(10 \times n_f + \lfloor n_s/2 \rfloor - N_{OFFSET,CQI}) \bmod (N_{pd}) = 0 \quad \text{[Equation 1]}$$

In Equation 1, $n_f$ is a system frame number, and $n_s$ is a slot number within a frame.

Furthermore, in relation to each serving cell, the cycle $M_{RI}$ and the relative offset $N_{offset,RI}$ are determined based on the parameter 'ri-ConfigIndex' ($I_{RI}$) with respect to RI reporting. 'cqi-pmi-ConfigIndex' and 'ri-ConfigIndex' are configured by a high layer signal, such as an RRC message. The relative offset $N_{offset,RI}$ for an RI has a value of a set $\{0, -1, \ldots, -(N_{pd}-1)\}$.

If RI reporting is configured, subframes in which an RI is reported may be subframes that satisfy the following equation.

$$(10 \times n_f + \lfloor n_s/2 \rfloor - N_{OFFSET,CQI} - N_{OFFSET,RI}) \bmod (N_{pd} \cdot M_{RI}) = 0 \quad \text{[Equation 2]}$$

As illustrated in Equation 2, the reporting interval of RI reporting is an $M_{RI}$ multiple of $N_{pd}$.

If both wideband CQI/PMI reporting and subband CQI reporting have been configured, wideband CQI/PMI reporting and subband CQI reporting may be performed in subframes that satisfy the following equation.

$$(10 \times n_f + \lfloor n_s/2 \rfloor - N_{OFFSET,CQI}) \bmod N_{pd} = 0 \quad \text{[Equation 3]}$$

If a Precoding Type Indicator (PTI) is not transmitted (because it is not configured) or the most recently transmitted PTI is 1, wideband CQI/wideband PMI (or a wideband second PMI for a wideband CQI/transmission mode 9) reporting has a cycle $H \cdot N_{pd}$ and is transmitted in subframes that satisfy the following equation.

$$(10 \times n_f + \lfloor n_s/2 \rfloor - N_{OFFSET,CQI}) \bmod (N \cdot N_{pd}) = 0 \quad \text{[Equation 4]}$$

In Equation 4, H is an integer, and H=J·K+1 is defined. J is a bandwidth part number, and K is set by a higher layer.

If the most recently transmitted PTI is 0, wideband first PMI indicator reporting has a cycle of $H' \cdot N_{pd}$ and is transmitted in subframes that satisfy the following equation.

$$(10 \times n_f + \lfloor n_s/2 \rfloor - N_{OFFSET,CQI}) \bmod (H' \cdot N_{pd}) = 0 \quad \text{[Equation 5]}$$

H' is signaled by a higher layer.

The remaining reporting opportunities between two consecutive wideband first PMI indicator reportings are used for a wideband second PMI indicator and wideband CQI reporting. If RI reporting is configured, the interval between RI reportings is the product of $H \sim N_{pd}$, that is, the cycle of wideband CQI/PMI reporting, and $M_{RI}$. The reporting of an RI may be performed in subframes that satisfy the following equation.

$$(10 \times n_f + \lfloor n_s/2 \rfloor - N_{OFFSET,CQI} - N_{OFFSET,RI}) \bmod (H \cdot N_{pd} \cdot M_{RI}) = 0 \quad \text{[Equation 6]}$$

Figure 5:
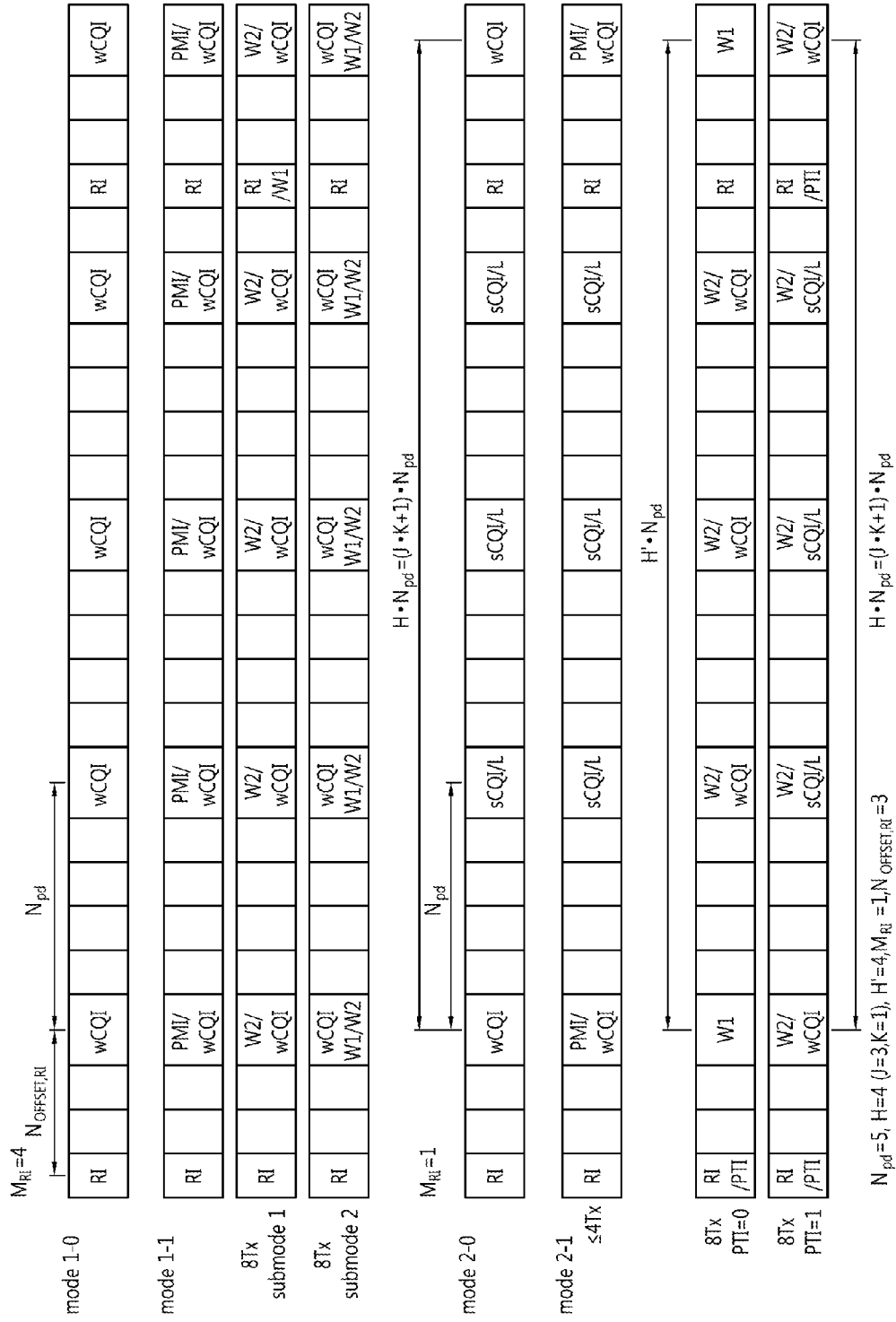
FIG. 5 illustrates the CSI transmission cycle and reporting type according to each CSI mode in Table 3.

FIG. 5 illustrates CSI transmission cycles and reporting types according to each of the CSI modes of Table 3. In this case, it is assumed that $N_{pd}$=5, H=4, J=3, K=1, H'=4, $M_{RI}$=1, and $N_{OFFSET,RI}$=3. Furthermore, 'wCQI' denotes a wideband CQI, 'sCQI' denotes a subband CQI, W1 denotes a wideband first PMI indicator, and W2 denotes a wideband second PMI indicator.

4. A Periodic Transmission of CSI

A control signal that request CSI to be transmitted, that is, an aperiodic CSI request signal, may be included in the scheduling control signal of a PUSCH transmitted through a PDCCH, that is, an UL grant. In such a case, UE aperiodically reports CSI through a PUSCH.

1) Transmission of a CQI/PMI/RI Through a PUSCH After Receiving a CQI Transmission Request Signal (CQI Request)

In such a case, a control signal (CQI request) that requests CSI to be transmitted is included in a PUSCH scheduling control signal (UL grant) transmitted through a PDCCH. The following table 5 illustrates modes when a CQI/PMI/RI is transmitted through a PUSCH.

TABLE 8

| | | PMI Feedback Type | | |
|---|---|---|---|---|
| | | No PMI | Single PMI | Multiple PMI |
| PUSCH CQI feedback type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | |

The modes of Table 8 may be indicated by a high layer signal transmitted by a BS, and all the CQI/PMI/RI may be transmitted through the PUSCH of the same subframe. Mode 1-2, mode 2-0, mode 2-2, mode 3-0, and mode 3-1 of Table 5 are described.

1-1) Mode 1-2

UE selects a precoding matrix assuming that data is transmitted through only a corresponding subband with respect to each subband. The UE generates a CQI by assuming a selected precoding matrix with respect to a system band or all the bands (this is called a band set S) designated by a high layer signal.

The UE sends the CQI and the PMI value of each subband. In this case, the size of each subband may be different depending on the size of a system band.

1-2) Mode 2-0

UE selects preferred M subbands with respect to a system band or a band (or a band set S) designated by a high layer signal. The UE generates a single CQI value assuming that data has been transmitted in the selected M subbands. The UE additionally generates a single CQI (a wideband CQI or a wideband CQI) value with respect to the system band or the band set S.

If a plurality of codewords is present with respect to the selected M subbands, the CQI values of the respective codewords are defined in a differential form. A differential CQI may be equal to "an index corresponding to the CQI values of the selected M subbands–a wideband CQI index."

The UE sends information about the locations of the selected M subbands, the single CQI value of the selected M subbands, and the CQI value generated with respect to the system band or the band set S. In this case, the size of a subband and the M value may be different depending on the size of a system band.

1-3) Mode 2-2

UE selects the locations of M preferred subbands and a single precoding matrix, corresponding to the M preferred subbands, at the same time assuming that data is transmitted through the M preferred subbands.

The CQI values of the M preferred subbands are defined every codeword. The UE additionally generates the wideband CQI value of a system band or a band set S.

The UE sends information about the locations of the M preferred subbands, the single CQI value of the selected M subbands, the single Precoding Matrix Index (PMI) of the M preferred subbands, a wideband PMI, and a wideband CQI value. In this case, the size of a subband and an M value may be different depending on the size of a system band.

1-4) Mode 3-0

UE generates a wideband CQI value. The UE generates the CQI value of each of subbands assuming that data is transmitted through each subband. In this case, although an RI >1, the CQI value is indicative of only the CQI value of a first codeword.

1-5) Mode 3-1

UE generates a single precoding matrix with respect to a system band or a band set S. The UE generates the CQI of a subband for each codeword by assuming a single precoding matrix previously generated with respect to each subband. The UE may generate a wideband CQI by assuming a single precoding matrix.

The CQI value of each subband is represented in a differential form. That is, a subband CQI may be equal to "a subband CQI index−a wideband CQI index." The size of a subband size may be different depending on the size of a system band.

<Carrier Aggregation (CA)>

A CA system is described below.

Figure 6:
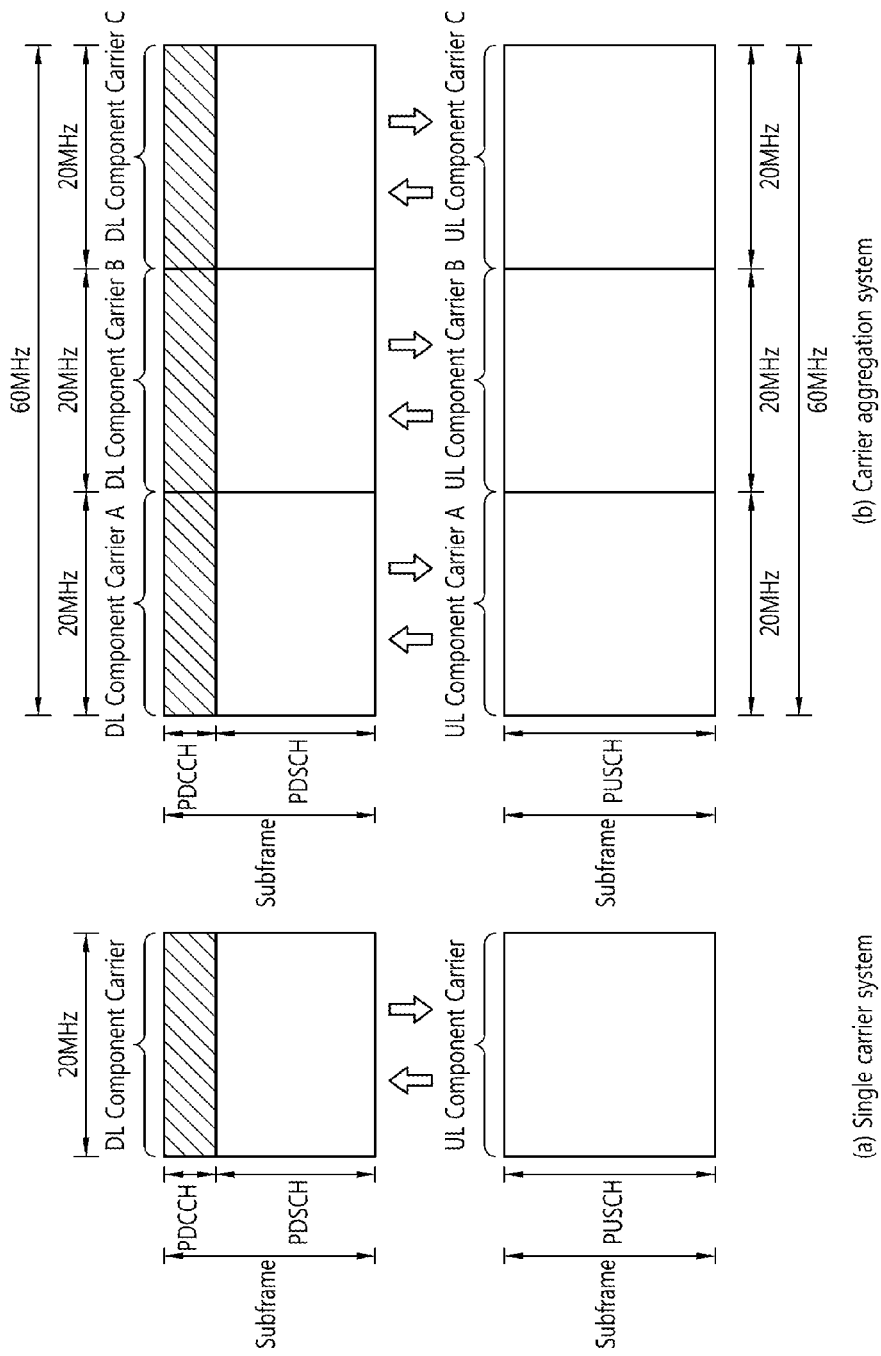
FIGS. 6(a) and 6(b) illustrate a comparison example of an existing single carrier system and a CA system.

FIG. 6 is a comparison example of an existing single carrier system and a CA system.

Referring to FIG. 6, in a single carrier system, only a single carrier is supported for UE in uplink and downlink. The bandwidth of a carrier may be various, but the number of carriers assigned to UE is one. In contrast, in a Carrier Aggregation (CA) system, a plurality of CCs DL CCs A to C and UL CCs A to C may be assigned to UE. A Component Carrier (CC) means a carrier used in a CA system, and it may be abbreviated as a carrier. For example, in order to allocate a bandwidth of 60 MHz to UE, 3 CCs each having 20 MHz may be assigned to the UE.

A CA system may be divided into a contiguous CA system in which aggregated carriers are contiguous to each other and a non-contiguous CA system in which aggregated carriers are separated from each other. When it is simply called a CA system hereinafter, it should be understood that the CA system includes a case where CCs are contiguous and a case where CCS are not contiguous.

A CC, that is, a target when one or more CCs are aggregated, may use bandwidths used in an existing system for backward compatibility with the existing system. For example, a 3GPP LTE system supports bandwidths of 1.4 MHz, 3 MHz, 5 MHz, 10 MHz, 15 MHz, and 20 MHz. A 3GPP LTE-A system may configure a broadband of 20 MHz or higher using only the bandwidths of the 3GPP LTE system. Alternatively, a 3GPP LTE-A system may configure a broadband by defining new bandwidths without using the bandwidths of an existing system.

The system frequency band of a wireless communication system is divided into a plurality of carrier frequencies. In this case, the carrier frequency means the center frequency of a cell. Hereinafter, a cell may mean downlink frequency resources and uplink frequency resources. Alternatively, a cell may mean a combination of downlink frequency resources and optional uplink frequency resources. Furthermore, in general, if a CA is not taken into consideration, a single cell may always include uplink and downlink frequency resources that form a pair.

In order for packet data to be transmitted and received through a specific cell, UE first has to complete a configuration for the specific cell. In this case, the configuration means a state in which the reception of system information necessary to transmit and receive data to and from the specific cell has been completed. For example, the configuration may include an overall process of receiving common physical layer parameters necessary for the transmission/reception of data, Medium Access Control (MAC) layer parameters, or parameters necessary for a specific operation in the RRC layer. A configuration-completed cell is in a state in which the cell may immediately transmit and receive packet data only it has only to receive information about which the packet data may be transmitted.

A cell in the configuration-completed state may be in the activation or deactivation state. In this case, the activation refers to a state in which data is being transmitted or received or a state in which data is ready to be transmitted or received. UE may monitor and receive the control channel (PDCCH) and data channel (PDSCH) of an activated cell in order to check resources (they may be the frequency, the time, etc.) assigned thereto.

Deactivation refers to a state in which traffic data cannot be transmitted or received, but measurement or the transmission/reception of minimum information are possible. UE may receive necessary System Information (SI) in order to receive packets from a deactivated cell. In contrast, the UE does not monitor or receive the control channel (PDCCH) and data channel (PDSCH) of a deactivated cell in order to check resources (they may be a frequency, time, etc.) assigned thereto.

Cells may be classified into a primary cell, a secondary cell, and a serving cell.

The primary cell means a cell that operates in a primary frequency, a cell in which UE performs an initial connection establishment procedure or a connection re-establishment procedure with a BS, or a cell that is indicated as a primary cell in a handover process.

The secondary cell means a cell that operates in a secondary frequency. The secondary cell is configured once RRC establishment is set up and used to provide additional radio resources.

The serving cell is formed of a primary cell in the case of UE in which a Carrier Aggregation (CA) has not been configured or to which a CA cannot be provided. If a CA has been configured for UE, the term 'serving cell' indicates a cell configured for UE and may be plural in this case. One serving cell may include a single DL CC or a pair of {DL CC, UL CC}. A plurality of serving cells may include a primary cell and one of all secondary cells or a set of a plurality of secondary cells.

A Primary Component Carrier (PCC) means a Component Carrier (CC) corresponding to a primary cell. A PCC is a CC through which UE forms connection or RRC connection with a BS at the early stage from among some CCs. A PCC is a special CC that is responsible for connection or RRC connection for signaling regarding a plurality of CCs and that manages UE context, that is, connection information related to UE. Furthermore, a PCC is always in the activation state when it is in RRC connected mode after forming connection or RRC connection with UE. A DL CC corresponding to a primary cell is called a DL Primary Component Carrier (DL PCC), and an UL CC corresponding to a primary cell is called an UL Primary Component Carrier (UL PCC).

A Secondary Component Carrier (SCC) means a CC corresponding to a secondary cell. That is, an SCC is a CC assigned to UE in addition to a PCC and is a carrier extended for additional resource assignment, etc. by UE in addition to a PCC. An SCC may be divided into the activation or deactivation state. A DL CC corresponding to a secondary cell is called a DL Secondary Component Carrier (DL SCC). An UL CC corresponding to a secondary cell is called an UL Secondary Component Carrier (UL SCC).

A primary cell and a secondary cell have the following characteristics.

First, a primary cell is used to transmit a PUCCH. Second, a primary cell is always activated, whereas a secondary cell is a carrier that is activated or deactivated according to specific conditions. Third, when a primary cell experiences a Radio Link Failure (hereinafter referred to as an RLF), RRC re-establishment is triggered. Fourth, a primary cell may be changed by a change of a security key or by a handover procedure that is accompanied by a random access channel (RACH) procedure. Fifth, Non-Access Stratum (NAS) information is received through a primary cell. Sixth, in the case of an FDD system, a primary cell is always formed of a pair of a DL PCC and an UL PCC. Seventh, a different CC may be configured as a primary cell in each UE. Eighth, a primary cell may be replaced through only a handover process or a cell selection/cell reselection process. In adding a new secondary cell, RRC signaling may be used to transmit system information about a dedicated secondary cell.

In relation to a CC that forms a serving cell, a DL CC may form a single serving cell, or a DL CC and an UL CC may form a single serving cell through connection establishment. However, a serving cell is not formed of only a single UL CC.

The activation/deactivation of a CC has the same concept as the activation/deactivation of a serving cell. For example, assuming that a serving cell1 is formed of a DL CC1, the activation of the serving cell1 means the activation of the DL CC1. Assuming that a serving cell2 is configured through connection establishment of a DL CC2 and an UL CC2, the activation of the serving cell2 means the activation of the DL CC2 and the UL CC2. In this sense, each CC may correspond to a cell.

The number of CCs that are aggregated between downlink and uplink may be differently set. A case where the number of aggregated DL CCs is the same as the number of aggregated UL CCs is called a symmetric aggregation, and a case where the number of aggregated DL CCs is different from the number of aggregated UL CCs is called an asymmetric aggregation. Furthermore, the CCs may have different sizes (i.e., bandwidths). For example, assuming that 5 CCs are used to form a 70 MHz band, the 70 MHz band may be configured like 5 MHz CC (carrier #0)+20 MHz CC (carrier #1)+20 MHz CC (carrier #2)+20 MHz CC (carrier #3)+5 MHz CC (carrier #4).

As described above, unlike a single carrier system, a CA system may support a plurality of CCs, that is, a plurality of serving cells.

Such a CA system may support cross-carrier scheduling. Cross-carrier scheduling is a scheduling method capable of performing the resource assignment of a PDSCH transmitted through another CC and/or the resource assignment of a PUSCH transmitted through CCs other than CCs that are basically linked to a specific CC, through a PDCCH transmitted through the specific CC. That is, a PDCCH and a PDSCH may be transmitted through different DL CCs, and a PUSCH may be transmitted through another UL CC other than an UL CC that is linked to a DL CC on which a PDCCH including an UL grant has been transmitted. As described above, in a system supporting cross-carrier scheduling, a carrier indicator informing that a PDSCH/PUSCH providing control information are transmitted through what DL CC/UL CC is necessary for a PDCCH. A field including such a carrier indicator is hereinafter called a Carrier Indication Field (CIF).

A CA system supporting cross-carrier scheduling may include a CIF in a conventional Downlink Control Information (DCI) format. In a system supporting cross-carrier scheduling, for example, in an LTE-A system, 3 bits may be extended because a CIF is added to an existing DCI format (i.e., a DCI format used in LTE). In the structure of a PDCCH, an existing coding method and resource assignment method (i.e., resource mapping based on a CCE) may be reused.

A BS may configure a PDCCH monitoring DL CC (monitoring CC) set. The PDCCH monitoring DL CC set is formed of some of all the aggregated DL CCs. When cross-carrier scheduling is configured, UE performs PDCCH monitoring/decoding on only the DL CCs included in the PDCCH monitoring DL CC set. In other words, the BS sends a PDCCH for a PDSCH/PUSCH to be scheduled through only the DL CCs included in the PDCCH monitoring DL CC set. The PDCCH monitoring DL CC set may be configured in a UE-specific, UE group-specific, or cell-specific way.

As in the aforementioned CA system, in LTE-A, a plurality of serving cells may be allocated to UE. In such a case, a BS may independently configure a periodic CSI reporting mode (hereinafter may be abbreviated as a CSI reporting mode) and the cycle of periodic CSI reporting (hereinafter may be abbreviated as a CSI reporting cycle) for each serving cell so that the UE is able to report the CSI of a downlink channel state, that is, Channel State Information (CSI) for each serving cell.

In such a case, the transmission of the plurality of CSI Types of a plurality of cells may be configured in the same UL subframe, which is represented by a CSI collision. Upon a CSI collision, UE may send only a single CSI Type and drop the remaining pieces of CSI according to priority.

First, priority in a prior art applied upon a CSI collision is described.

<Priority of CSI for the Same Cells>

If the CSI report of CSI Type 3, 5, or 6 collides against the CSI report of CSI Type 1, 1a, 2, 2b, 2c, or 4 with respect to a single serving cell, the CSI report of CSI Type 1, 1a, 2, 2b, 2c, or 4 is dropped because it has low priority.

The remaining CSI Types other than RI series (i.e., the CSI Types 3, 5, and 6) are transmitted at an interval of a multiple of $N_{pd}$, whereas the RI series are separately configured in subframes using $N_{offset,RI}$ not a multiple of $N_{pd}$. If $N_{offset,RI}=0$, the RI series may collide against other CSI Types. Upon collision, a CSI Type having low priority than the RI series is dropped.

<Priority of CSI for Different Cells>

A first rule: if two or more serving cells have been configured for UE, the UE performs only CSI reporting on only one serving cell in a given subframe. The CSI report of CSI Type 3, 5, 6, or 2a by a first cell may collide against the CSI report of CSI Type 1, 1a, 2, 2b, 2c, or 4 by a second cell in the given subframe (i.e., a CSI transmission subframe). In such a case, the CSI report of CSI Type 1, 1a, 2, 2b, 2c, or 4 is dropped because it has lower priority.

The CSI report of CSI Type 2, 2b, 2c, or 4 by the first cell may collide against the CSI report of CSI Type 1 or 1a by the second cell in the given subframe. In such a case, the CSI report of CSI Type 1 or 1a is dropped because it has low priority. The first cell and the second cell are different cells.

A second rule: the CSI reports of CSI Types having the same priority by different serving cells may collide against each other in a given subframe. In such a case, the CSI of a serving cell having the lowest serving cell index (ServCellIndex) is reported, and the pieces of CSI of all the remaining serving cells are dropped.

In accordance with such a conventional technology, when the CSI cycles of a plurality of serving cells collide against each other, UE selects and sends only the CSI of a single serving cell and drops the remaining CSI reports. Furthermore, a conventional scheme also has a rule that periodic CSI is dropped if the UL ACK/NACK transmission and periodic CSI transmission of a PDSCH collide against each other. In accordance with such a conventional technology, a periodic CSI reporting effect is reduced by half and system throughput is lost. In particular, such a problem may become more severe in a TDD system in which the number of UL subframes is limited.

Accordingly, in a future wireless communication system, if the CSI transmissions of a plurality of serving cells collide against each other in a single UL subframe, to send the pieces of CSI of the plurality of serving cells at the same time is taken into consideration. The pieces of periodic CSI of a plurality of serving cells are hereinafter called multiple CSI (mCSI). The subject of reporting of multiple CSI is illustrated as being a serving cell (more specifically, a DL CC included in a serving cell), for convenience of description, but the present invention is not limited thereto. That is, the subject of reporting of multiple CSI is not limited to a DL CC and may include all subjects that have different channel characteristics and require different reporting. For example, the subject of reporting of multiple CSI may include a plurality of transport nodes (also called points) in CoMP communication. In such a case, a CSI process for the measurement of CSI is differently provided. The CSI process may include one or more CSI-RSs and Interference Measurement Resources (IMR). CSI processes may have respective identities (ID) and may be distinguished from each other by the IDs.

The periodic reporting of multiple CSI may be transmitted through a PUCCH or a PUSCH. If multiple CSI is transmitted through a PUCCH, the PUCCH format 3 may be used.

In LTE-A, the PUCCH format 3 was introduced in order to send uplink control information (e.g., ACK/NACK and an SR) of a maximum of 21 bits (they are information bits and the number of bits prior to channel coding, and they are a maximum of 22 bits if an SR is included). The PUCCH format 3 uses QPSK as a modulation scheme. In the PUCCH format 3, the number of bits that may be transmitted in a subframe is 48 bits (they are the number of bits transmitted after information bits are subjected to channel coding).

The PUCCH format 3 performs block spreading-based transmission. That is, a modulation symbol sequence in which multi-bit ACK/NACK has been modulated using a block-spreading code is spread in a time domain and then transmitted.

Figure 7:
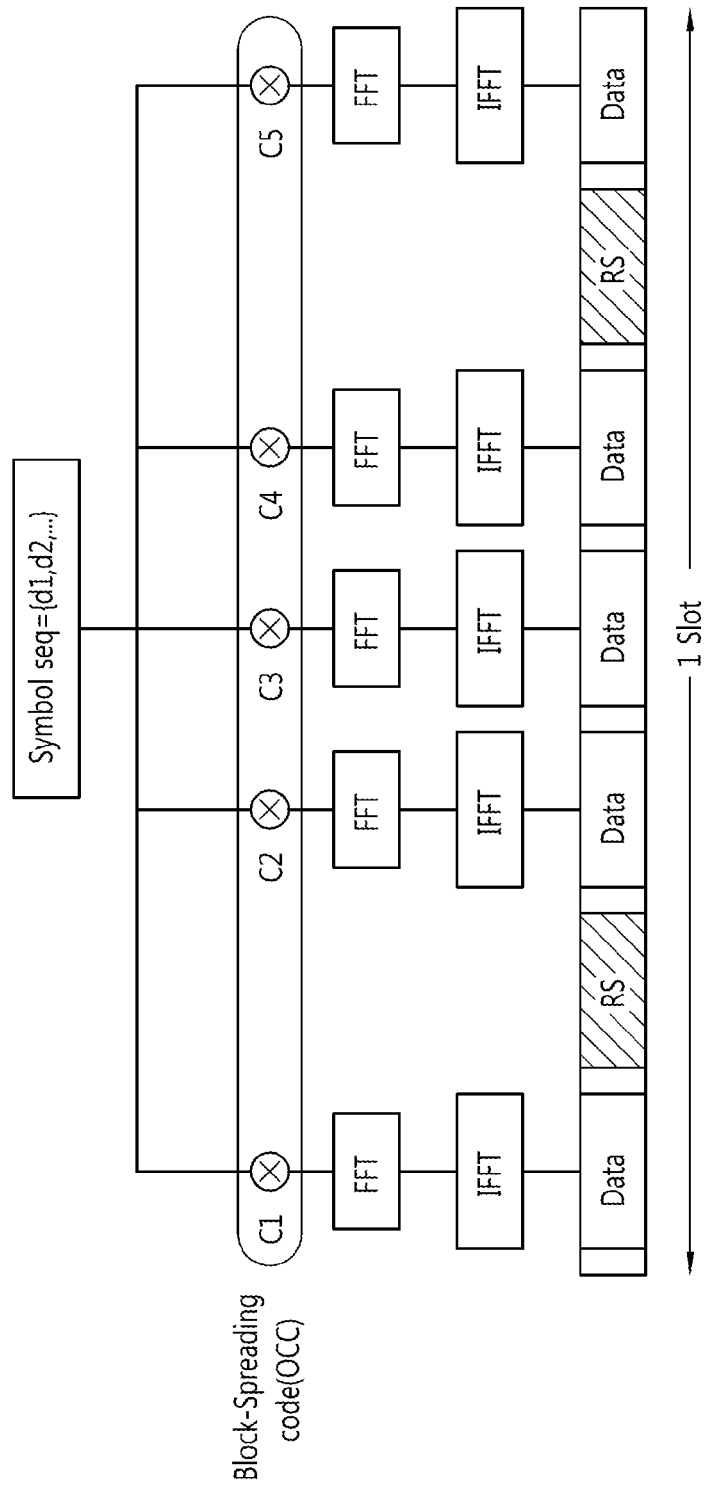
FIG. 7 illustrates the channel structure of a PUCCH format 3.

FIG. 7 illustrates the channel structure of the PUCCH format 3.

Referring to FIG. 7, a modulation symbol sequence {d1, d2, . . . } is subject to a block-spreading code and spread in a time domain. The block-spreading code may be an Orthogonal Cover Code (OCC). In this case, the modulation symbol sequence may be the sequence of modulation symbols obtained by performing ACK/NACK information bits, that is, a multi-bit, on channel coding (using an RM code, a TBCC, or a punctured RM code) in order to generate ACK/NACK-coded bits and then modulating (e.g., QPSK) the ACK/NACK-coded bits. The sequence of modulation symbols is subject to Fast Fourier Transform (FFT), Inverse Fast Fourier Transform (IFFT), mapped to data symbols of a slot, and then transmitted. FIG. 6 illustrates that 2 RS symbols are included in a single slot, but 3 RS symbols may be included in the single slot. In such a case, a block-spreading code of a length 4 may be used.

The transmission of a PUSCH may be divided into transmission according to dynamic scheduling and the remaining transmission. The transmission of a PUSCH according to dynamic scheduling may include, for example, the transmission of the PUSCH scheduled using an UL grant, first PUSCH transmission scheduled using Semi-Persistent Scheduling (SPS) activation/re-activation PDCCH, etc.

The transmission of a PUSCH other than dynamic scheduling includes a method of allocating PUSCH resources semi-persistently without an UL grant as in SPS and sending the PUSCH, a method of designating PUSCH resources through RRC and sending a periodic PUSCH, etc. In the case of resources that are periodically configured as described above, frequency selective scheduling is not suitable, and transmission using frequency diversity is more suitable.

<Arrangement of Transmission Time Points>

Figure 8:
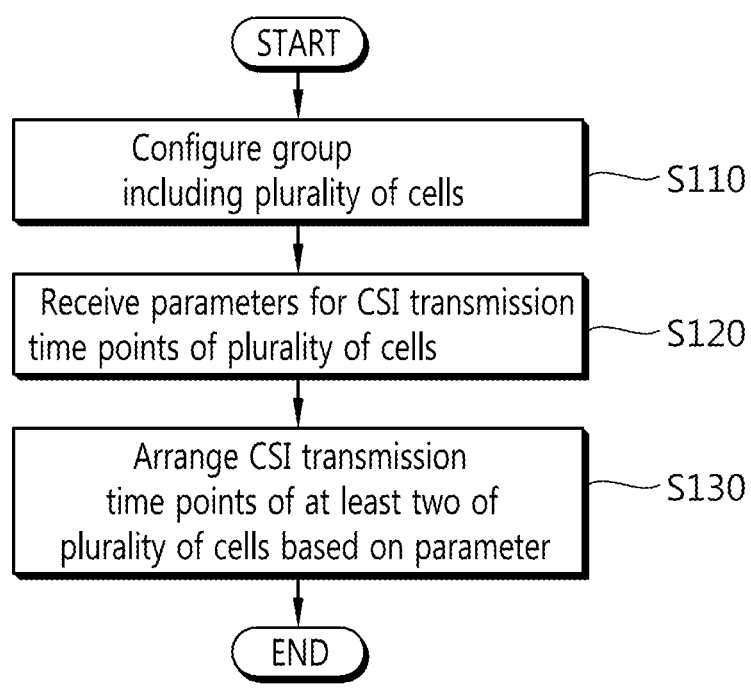
FIG. 8 illustrates a method of transmitting CSI in accordance with an embodiment of the present invention.

FIG. 8 illustrates a method of transmitting CSI in accordance with an embodiment of the present invention.

UE configures a group including a plurality of cells (S110). All the cells configured for the UE may be grouped, or only some of all the cells configured for the UE may be grouped.

The UE may be provided with an instruction regarding cells included in each group through a high layer signal, such as an RRC message, and may configure a group including a plurality of cells.

Alternatively, the UE and a BS may share the rules of cells that form a group. In such a case, the UE may configure the cells that form the group without separate signaling. For example, cells within a single group may be cells having the same transmission mode. That is, the cells may be grouped based on the transmission modes of the cells. The reason for this is that a CSI reporting mode required for each transmission mode is different and a transmission cycle and a CSI reporting type in each transmission cycle are different every CSI reporting mode.

Alternatively, the cells may be grouped depending on whether they are cells included in a CSI reporting mode, a downlink bandwidth, or CoMP or whether or not they are included in CoMP. For example, the number of subbands may be different depending on the downlink bandwidth of a cell. If cells having the same bandwidth or a bandwidth within a specific range are grouped, the number of subbands becomes identical or similar and similarity occurs when CSI reporting is performed.

In the grouping of the cells, the fact that to group cells having similar characteristics is efficient for CSI feedback has been taken into consideration.

The UE may group the cells using any one of the aforementioned various criteria.

The UE receives a parameter for the CSI transmission time points of the plurality of cells (S120). For example, the UE may receive the parameter through a high layer signal, such as an RRC message.

The UE arranges the CSI transmission time points of at least two of the plurality of cells based on the parameter (S130). In this case, the arrangement means that the CSI transmission time point is configured so that the pieces of CSI of the plurality of cells are transmitted in the same subframe, that is, so that the transmissions of the pieces of CSI of the plurality of cells collide against each other.

The parameter for the CSI transmission time point (hereinafter may be abbreviated as a parameter) may be the aforementioned 'cqi-pmi-ConfigIndex' ($I_{CQI/PMI}$), 'ri-ConfigIndex' ($I_{RI}$), for example. The parameter may be given so that the CSI transmission time points of the grouped cells are arranged.

For example, a parameter that belongs to parameters for CSI transmission time points and that determines the transmission time point of a CQI may be given so that the values $N_{pd}$ of the grouped cells are set to have the same value or are set to have a mutual integer number times or a value that can be divided. Furthermore, the values $N_{OFFSET,CQI}$ of the cells may be set to be identical based on the parameter.

It is assumed that the values $N_{pd}$ and $N_{OFFSET,CQI}$ of a cell #0 are $N^{cell\ 0}_{pd}$ and $N^{cell\ 0}_{OFFSET,CQI}$ and the values $N_{pd}$ and $N_{OFFSET,CQI}$ of a cell #1 are $N^{cell\ 1}_{pd}$ and $N^{cell\ 1}_{OFFSET,CQI}$. If the cell #0 and the cell #1 have been configured to form a group, "$N^{cell\ 0}_{pd} = A \cdot N^{cell\ 1}_{pd}$, $N^{cell\ 0}_{OFFSET,CQI} = N^{cell\ 1}_{OFFSET,CQI} + a \cdot N^{cell\ 1}_{pd}$, $a \in \{0, 1, 2, \ldots, A-1\}$" may be set based on a parameter for CSI transmission time points in order to arrange the CSI transmission time points. In this case, A has been illustrated as being a natural number, and 0, 1 has been illustrated as being a cell index.

For another example, a parameter that belongs to parameters for CSI transmission time points and that determines the transmission time point of an RI may be set using the value $N_{OFFSET,RI}$ of each of the grouped cells as 0. The transmission of RI series that belong to pieces of CSI is performed between $N_{pd}$, that is, the transmission intervals of a CQI/PMI based on $N_{OFFSET,RI} \in \{0, -1, \ldots, -(N_{pd}-1)\}$. If "$N_{OFFSET,RI} = 0$" is not true, however, it deviates from the cycle $N_{pd}$. In order to prevent such deviation, the parameter that determines the transmission time points of RIs may be set to $N_{OFFSET,RI} = 0$ in each cell. For example, in accordance with Table 7, assuming that the parameter that determines the transmission time point of an RI is $I_{RI}$, a relationship "$I_{RI} \in \{0, 161, 322, 483, 644, 805, 966\}$" is established.

If the cell #0 and the cell #1 have been configured to form a group, a parameter that determines an RI transmission time point may be set so that "$N^{cell\ 0}_{pd} = A \cdot N^{cell\ 1}_{pd}$, $N^{cell\ 0}_{OFFSET,RI} = a \cdot N^{cell\ 1}_{pd}$, and $a \in \{0, 1, 2, \ldots, A-1\}$" is satisfied in order to arrange the transmission time points of RIs. Accordingly, the RI transmission cycle of the cell #0 and the RI transmission cycle of the cell #2 can be arranged. In this case, A has been illustrated as being a natural number, and 0, 1 has been illustrated as being a cell index.

If cells use different CSI modes, a parameter for an RI transmission time point may be given so that "$M^{cell\ 0}_{RI} = (J \cdot K+1) M^{cell\ 1}_{RI}$" is satisfied in order to arrange the transmission cycles of RIs.

Figure 9:
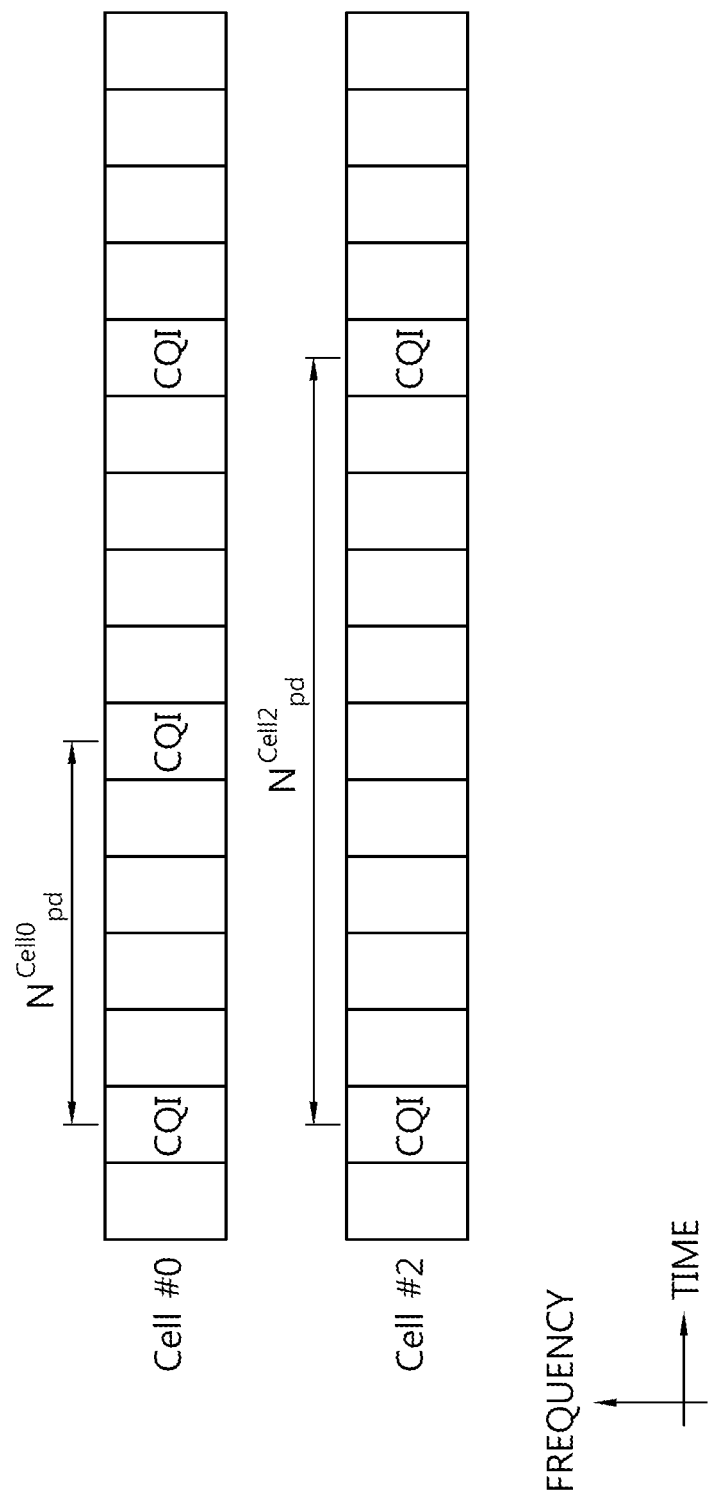
FIG. 9 illustrates an example of CSI transmission time points configured according to the method of FIG. 8.

FIG. 9 illustrates an example of CSI transmission time points configured according to the method of FIG. 8.

It is assumed that cells #0 to #3 have been configured for UE. In this case, the cells #0 and #2 may be grouped. As described above with reference to FIG. 8, the UE may receive a parameter for CSI transmission time points and configure the CSI transmission time points of the cells #0 and #2. In this case, the CQI transmission cycle $N^{cell\ 0}_{pd}$ of the cell #0 may be 5 subframes. Furthermore, the CQI transmission cycle $N^{cell\ 2}_{pd}$ of the cell #2 may be 10 subframes. That is, the CSI transmission cycle of the cell #2 may be set to be a multiple of that of the cell #1. Furthermore, $N_{OFFSET,CQI}$ of the cells #0 and #2 may be set to have the same value based on the parameter for the CSI transmission time points.

In a conventional technology, parameters for the CSI transmission time points of cells have been independently set. Furthermore, as described in connection with <Priority of CSI for different cells>, if the pieces of CSI of a plurality of cells collide against each other, only the CSI of a single cell is transmitted and the remaining pieces of CSI are dropped according to priority. Accordingly, in the conventional technology, to different set the transmission time points of pieces of CSI of cells to a maximum degree may be advantageous.

In contrast, in the present invention, parameters for CSI transmission time points are arranged based on the CSI transmission time points of cells. That is, the CSI transmission time points are controlled so that the pieces of CSI of a plurality of cells collide against each other at the same time point. In this case, the definition of a channel format in which more payload is transmitted compared to a prior art as in the PUCCH format 3 is taken into consideration.

The aforementioned examples are examples in which different cells within a group are arranged based on a parameter for CSI transmission time points so that the same CSI type is transmitted. It is assumed that cells within a group use CSI modes having the same series. In accordance with Equations 1 to 6, a CSI transmission subframe in which CSI is transmitted is determined in such a manner that an offset, such as $N_{OFFSET,CQI}$ or $N_{OFFSET,RI}$, has been applied to a system frame number. Accordingly, if $N_{OFFSET,CQI}$, $N_{OFFSET,RI}$, $N_{pd}$, and $M_{RI}$ are identically set in order to arrange the transmission time points of two different cells, the same CSI reporting type is always generated in a CSI transmission subframe.

However, the number of bits to be transmitted may be different for each CSI reporting type. For example, the number of bits of a CQI may be much greater than the number of bits of an RI. Accordingly, if only the same CSI reporting type is transmitted in a single CSI transmission subframe, the number of bits transmitted in each CSI transmission subframe may be greatly changed depending on that what CSI reporting type is transmitted. By taking such a point into consideration, different CSI reporting types are arranged in the same CSI transmission subframe so that the number of bits transmitted in each CSI transmission subframe is not greatly changed.

A method of adding a cell offset value that may be set for each cell to each of the cells within a group and configuring different CSI reporting types based on the cell offset values so that the cell offset values are transmitted in the same subframe is described below.

Hereinafter, with respect to a cell x, a cell offset value is represented by $N^{Cell\ x}{}_{OFFSET}$. If a cell offset is used, a CSI transmission subframe for each CSI mode may be represented as in the following equations. That is, Equations 1 to 6 may be sequentially changed into Equations 7 to 12 below. Equations 7 and 8 are about CSI modes 1-0 and 1-1, and Equations 9 to 12 are about CSI modes 2-0 and 2-1.

$$(10 \times n_f + \lfloor n_s/2 \rfloor - N_{OFFSET,CQI} - N_{OFFSET}{}^{Cellx}) \bmod (N_{pd}) = 0 \quad \text{[Equation 7]}$$

$$(10 \times n_f + \lfloor n_s/2 \rfloor - N_{OFFSET,CQI} - N_{OFFSET,RI} - N_{OFFSET}{}^{Cellx}) \bmod (N_{pd} \cdot M_{RI}) = 0 \quad \text{[Equation 8]}$$

$$(10 \times n_f + \lfloor n_s/2 \rfloor - N_{OFFSET,CQI} - N_{OFFSET}{}^{Cellx}) \bmod N_{pd} = 0 \quad \text{[Equation 9]}$$

$$(10 \times n_f + \lfloor n_s/2 \rfloor - N_{OFFSET,CQI} - N_{OFFSET}{}^{Cellx}) \bmod (H \cdot N_{pd}) = 0 \quad \text{[Equation 10]}$$

$$(10 \times n_f + \lfloor n_s/2 \rfloor - N_{OFFSET,CQI} - N_{OFFSET}{}^{Cellx}) \bmod (H' \cdot N_{pd}) = 0 \quad \text{[Equation 11]}$$

$$(10 \times n_f + \lfloor n_s/2 \rfloor - N_{OFFSET,CQI} - N_{OFFSET,RI} - N_{OFFSET}{}^{Cellx}) \bmod (H \cdot N_{pd} \cdot M_{RI}) = 0 \quad \text{[Equation 12]}$$

As illustrated in Equations 7 to 12, the CSI transmission subframe of each cell is determined by a cell offset value $N^{Cell\ X}{}_{OFFSET}$ specific to a cell, in addition to values determined by the CSI types of respective cells, such as $N_{OFFSET,CQI}$, $N_{OFFSET,RI}$, $N_{pd}$, and $M_{RI}$.

Accordingly, although the same CSI mode, the same CSI cycle, and the same CSI offset value are configured for a plurality of cells, the CSI transmission time points of the plurality of cells may be different based on cell-specific cell offset values $N^{Cell\ X}{}_{OFFSET}$. As a result, different types of CSI of different cells may be transmitted in the same CSI transmission subframe.

A BS may inform UE of a cell offset value through a high layer signal, such as an RRC message. The cell offset value may be applied to CSI reporting types other than the RI series as a separate value. The cell offset value may be represented by $N^{Cell\ K}{}_{OFFSET} = A \cdot N_{pd}$. In this case, A is a natural number. The cell offset value may be set to be an integer number times the $N_{pd}$.

Figure 10:
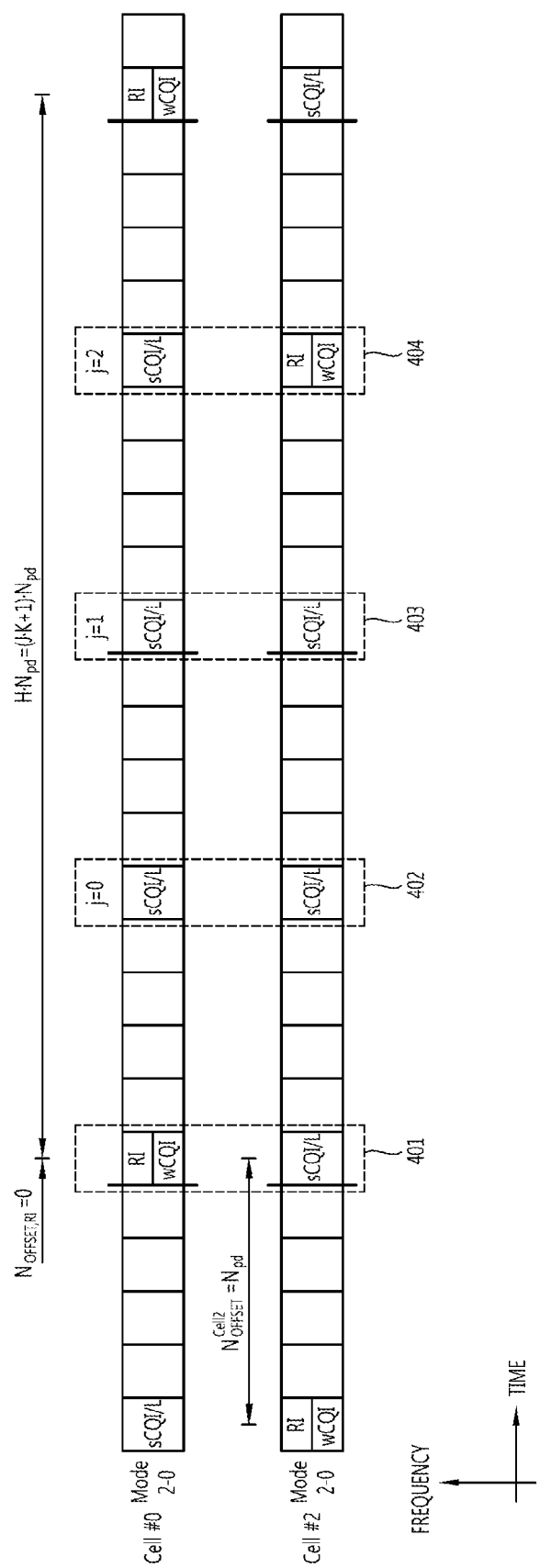
FIG. 10 illustrates that different types of CSI are transmitted in the same CSI transmission subframe based on a cell offset value.

FIG. 10 illustrates that different types of CSI are transmitted in the same CSI transmission subframe based on cell offset values.

Referring to FIG. 10, after the CSI transmission time points of cells #0 and #2 are arranged based on a parameter for the CSI transmission time points, the CSI transmission time point of the cell #2 and the CSI transmission time point of the cell #1 are changed based on cell offset values. For example, the cell offset value $N^{Cell2}{}_{OFFSET}$ of the cell #2 may be set to be $N_{pd}$. In such a case, different types of CSI of the cell #1 and the cell #2 are transmitted in the same subframe (e.g., 401, 402, 403, or 404).

Figure 11:
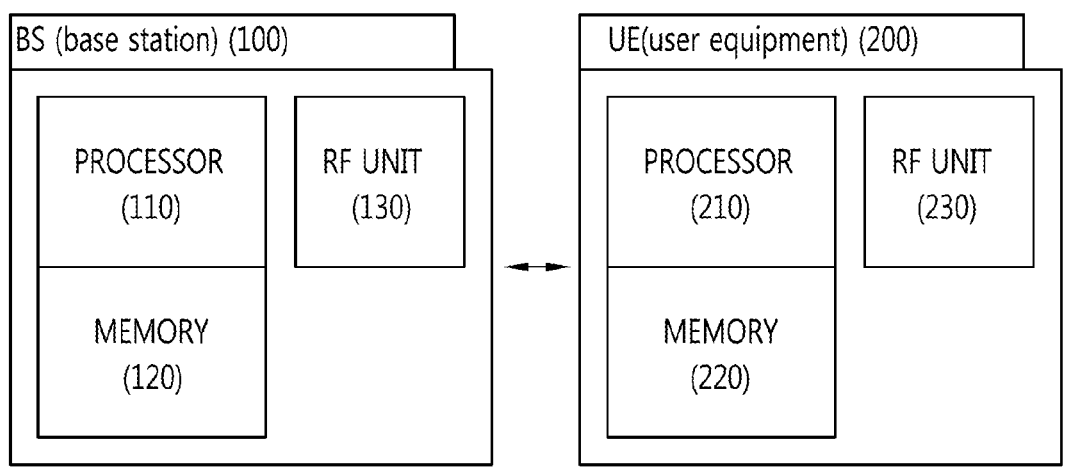
FIG. 11 illustrates the configuration of a BS and UE in accordance with an embodiment of the present invention.

FIG. 11 illustrates the configuration of a BS and UE in accordance with an embodiment of the present invention.

The BS 100 includes a processor 110, memory 120, and a Radio Frequency (RF) unit 130. The processor 110 implements the proposed functions, processes and/or methods. For example, the memory 120 is connected to the processor 110 and stores various types of information for driving the processor 110. The RF unit 130 is connected to the processor 110 and sends and/or receives radio signals.

The UE 200 includes a processor 210, memory 220, and an RF unit 230. The processor 210 implements the proposed functions, processes and/or methods. For example, the memory 220 is connected to the processor 210 and stores various types of information for driving the processor 210. The RF unit 230 is connected to the processor 210 and sends and/or receives radio signals.

The processor 110, 210 may include Application-Specific Integrated Circuits (ASICs), other chipsets, logic circuits, data processing devices and/or converters for mutually converting baseband signals and radio signals. The memory 120, 220 may include Read-Only Memory (ROM), Random Access Memory (RAM), flash memory, memory cards, storage media and/or other storage devices. The RF unit 130, 230 may include one or more antennas for transmitting and/or receiving radio signals. When an embodiment is implemented in software, the aforementioned scheme may be implemented as a module (process, function, etc.) for performing the aforementioned function. The module may be stored in the memory 120, 220 and executed by the processor 110, 210. The memory 120, 220 may be placed inside or outside the processor 110, 210 and connected to the processor 110, 210 using a variety of well-known means.

What is claimed is:

1. A method of transmitting, by a user equipment (UE), Channel State Information (CSI) in a wireless communication system, the method comprising:
    configuring, by the UE, a group comprising a plurality of cells,
    receiving, by the UE, a parameter for CSI transmission time points of the plurality of cells,
    determining, by the UE, the CSI transmission time points of the plurality of cells based on the parameter,
    transmitting, by the UE, the CSI based on the CSI transmission time points,
    wherein if the plurality of cells comprises a first cell and a second cell, a CSI transmission cycle of the first cell is determined to be identical with or an integer number times a CSI transmission cycle of the second cell based on the parameter for the CSI transmission time point.

2. The method of claim 1,
    wherein offset values that determine locations where CSI of the first cell and CSI of the second cell are started are determined to be identical based on the parameter for the CSI transmission time points.

3. The method of claim 1, wherein the CSI comprises a Channel Quality Indicator (CQI) and a Rank Indicator (RI).

4. The method of claim 1, wherein the CSI is periodically transmitted through a physical uplink control channel (PUCCH).

5. The method of claim 1, wherein the parameter for the CSI transmission time points is received through a Radio Resource Control (RRC) message.

6. The method of claim 1, further comprising:
    receiving a cell offset value specific to each of the plurality of cells, wherein the cell offset value is a value that moves the CSI transmission time points determined based on the parameter for the CSI transmission time points.

7. The method of claim 1, wherein CSI for the first cell and CSI for the second cell are transmitted to a base station in an identical uplink subframe.

8. A user equipment (UE), comprising:
    a Radio Frequency (RF) unit that sends and receives radio signals; and
    a processor, connected to the RF unit, that:
    configures a group comprising a plurality of cells,
    receives, via the RF unit, a parameter for CSI transmission time points of the plurality of cells, and
    determines the CSI transmission time points of the plurality of cells based on the parameter, and transmits, via the RF unit, the CSI based on the CSI transmission time points, wherein if the plurality of cells comprises a first cell and a second cell, a CSI transmission cycle of the first cell is determined to be identical with or an integer number times a CSI transmission cycle of the second cell based on the parameter for the CSI transmission time point.

\* \* \* \* \*